US 12,502,452 B2

(12) United States Patent
Bailey et al.

(10) Patent No.: US 12,502,452 B2
(45) Date of Patent: Dec. 23, 2025

(54) APPARATUS FOR AERATOR DISPERSAL OF A GASEOUS CLEANING AGENT

(71) Applicant: NUVINAIR, LLC, Plano, TX (US)

(72) Inventors: Kyle Bailey, Plano, TX (US); Jason Bailey, Plano, TX (US)

(73) Assignee: NUVINAIR, LLC, Plano, TX (US)

( * ) Notice: Subject to any disclaimer, the term of this patent is extended or adjusted under 35 U.S.C. 154(b) by 428 days.

(21) Appl. No.: 18/095,101

(22) Filed: Jan. 10, 2023

(65) Prior Publication Data
US 2024/0226361 A1 Jul. 11, 2024

(51) Int. Cl.
A61L 9/12 (2006.01)
A61L 9/04 (2006.01)
A61L 9/05 (2006.01)
A61L 9/14 (2006.01)
B01F 23/213 (2022.01)
(Continued)

(52) U.S. Cl.
CPC .............. A61L 9/05 (2013.01); A61L 9/048 (2013.01); A61L 9/12 (2013.01); A61L 9/14 (2013.01); B01F 23/2132 (2022.01); B01F 23/231 (2022.01); B01F 23/2312 (2022.01); B01F 25/103 (2022.01); B01F 25/3121 (2022.01); B01F 35/2205 (2022.01); B01F 35/2216 (2022.01); B05B 1/3421 (2013.01); B05B 7/265 (2013.01); A61L 2209/11 (2013.01); A61L 2209/134 (2013.01)

(58) Field of Classification Search
CPC .. A61L 9/12; A61L 9/14; B01F 23/231; B01F 23/2312
See application file for complete search history.

(56) References Cited

U.S. PATENT DOCUMENTS 3,420,509 A   1/1969   Katzman et al.
4,482,365 A   11/1984  Roach
(Continued)

FOREIGN PATENT DOCUMENTS

CN   1582661 A     2/2005
CN   101495190 A   7/2009
(Continued)

OTHER PUBLICATIONS

"CLo2 Efficiency System Demo 8 2015" YouTube Aug. 19, 2015 by ACES Environmental Svcs, LLC.
(Continued)

Primary Examiner — Robert A Hopkins
(74) Attorney, Agent, or Firm — Stephen Y. Liu; Carstens, Allen & Gourley, LLP

(57) ABSTRACT

The present technology presents an apparatus for cleaning the air and surfaces within an enclosed space of a viral, microbial, or malodor contamination. In an exemplary embodiment, the apparatus includes: a container configured to contain a water and a solid or gel pack that releases the gaseous cleaning agent upon contact with the water; an aerator housed in the base of the container; an air distributor in the container configured to distribute air from the aerator into the container to cause agitation of the water and release of gaseous agent; and a lid on the container having an opening configured to accelerate an air-borne spray of gaseous agent and water droplets therethrough into the surroundings.

26 Claims, 11 Drawing Sheets

(51) Int. Cl.
*B01F 23/23* (2022.01)
*B01F 23/231* (2022.01)
*B01F 25/10* (2022.01)
*B01F 25/312* (2022.01)
*B01F 35/22* (2022.01)
*B01F 35/221* (2022.01)
*B05B 1/34* (2006.01)
*B05B 7/26* (2006.01)

(56) References Cited

U.S. PATENT DOCUMENTS

| | | |
|---|---|---|
| 6,764,661 B1 | 7/2004 | Girard |
| 7,846,227 B2 | 12/2010 | Gotoh et al. |
| 9,433,695 B2 | 9/2016 | Aamodt et al. |
| 9,446,742 B1 | 9/2016 | Bailey et al. |
| 9,925,959 B2 | 3/2018 | Bailey et al. |
| 11,911,541 B1 * | 2/2024 | Eade .......... A61L 9/12 |
| 2004/0009094 A1 | 1/2004 | Adiga et al. |
| 2005/0074359 A1 | 4/2005 | Krieger et al. |
| 2006/0067854 A1 | 3/2006 | Andino et al. |
| 2008/0283626 A1 | 11/2008 | Aldana et al. |
| 2008/0292507 A1 | 11/2008 | Dee et al. |
| 2009/0148342 A1 | 6/2009 | Bromberg et al. |
| 2013/0028787 A1 | 1/2013 | Takeuchi et al. |
| 2013/0079733 A1 | 3/2013 | Burt et al. |
| 2013/0136685 A1 | 5/2013 | Baselli et al. |
| 2013/0189153 A1 | 7/2013 | Carson et al. |
| 2014/0271355 A1 | 9/2014 | Mason |

FOREIGN PATENT DOCUMENTS

| | | |
|---|---|---|
| CN | 101537203 A | 9/2009 |
| CN | 104321137 A | 1/2015 |
| JP | 2003040712 A | 2/2003 |
| JP | 2009051018 A | 3/2009 |
| JP | 2009234887 A | 10/2009 |
| KR | 101457648 B1 | 10/2014 |
| WO | 2006076033 A1 | 7/2006 |
| WO | 2009114962 A1 | 9/2009 |
| WO | 2017091354 A2 | 6/2017 |

OTHER PUBLICATIONS

"How to Use a Biocide Systems Car Deoderizer" YouTube Jun. 16, 2014 by StreetsideAuto.com.
"Odor Removal & Ozone Generator Usage" YouTube Mar. 12, 2009 by Detail King.
Refresh your fleet with Smart TumblerTM, powered by Spiffy®, Sep. 26, 2022; https://web.archive.org/web/20220926211152/https:/www.getspiffy.com/smarttumbler.

* cited by examiner

APPARATUS FOR AERATOR DISPERSAL OF A GASEOUS CLEANING AGENT

BACKGROUND

1. Field of the Invention

The technology relates to an apparatus configured for dispersal of a gaseous cleaning agent released by water from a solid or gel pack composition. The apparatus uses air, supplied by an aerator, to agitate water in contact with the solid or gel pack thereby releasing the gaseous cleaning agent into the surroundings where malodor and other contaminants may be neutralized or otherwise destroyed.

2. Description of the Related Art

There is increasing concern about the spread of contagious diseases, whether these may be influenza, common colds, corona viruses (SARS, MERS, COVID-19), or a potentially lethal virus such as Ebola, or microbial or viral diseases that are not even known or identified at this time. For purposes of this description, microscopic fungi, bacteria and viruses are included in the term "microbes." Most of these microbes and viruses are spread through contact; a first person contacts some surface (for example, by shaking the hand of a contagious person, or touches a contaminated surface, or breathes in fine contaminated droplets from the exhalation of a contagious person) and acquires the contamination. Once infected he/she then passes it on to yet another person. This chain of infection is well-known. Some contaminants, whether microbial or viral, appear to be spread through "air-borne" means. This includes coughing and the emitting of a fine spray of contaminated and contagious sputum.

In a modern urban environment, one of the main means of transportation is in enclosed vehicles such as, but not limited to, aircraft, busses, trains, boats, cars, minivans, SUVs and trucks. Some of these are vehicles that are open to the general public to use, and some members of that public may have a communicable disease that is spread through microbes or viruses. Surfaces inside the cabin of the vehicle, where passengers are usually seated, may over time become heavily contaminated with live microbes and viral contaminants. Thus, these surfaces serve to spread the microbial or viral disease to other passengers through contact.

Even in non-public, personal or family transportation, one family member may be ill and could contaminate surfaces thereby passing a contagious illness to other family members. This is especially a risk where school-aged children "pick up" a microbial or viral infection from classmates at school and can then pass it on to parents and siblings through contaminated surfaces in a family vehicle. Some microbes or viruses may be long-lived, and immunity to these may not be readily achieved. Thus, there is a chance of recurrent illness. Merely wiping surfaces may not eliminate the microbial or viral load on surfaces because surfaces may not be smooth and totally accessible. For example, surfaces are often textured and may have joints, pores and other features where microbial and viral loads may persist.

With regard to newly manufactured vehicles, the chances of a microbial or viral load on surfaces are low, unless the vehicle was contaminated during assembly. On the other hand, the chances that a "pre-owned" or "used" or "rental" vehicle is contaminated and a source of potential infection, is relatively far higher. Aside from the potential health issues, there are often also aesthetic issues with pre-owned or used cars: they may have an undesirable odor ("malodor") in the cabin space from pets carried in the space or from the way in which they were (mis)used by the previous owners or users. This can have a negative impact on the resale value of the vehicle.

There is a need from a public health standpoint to clean surfaces within a passenger carrying cabin space of vehicles to reduce any microbial and/or viral load. Moreover, there is also not only a public health need to do this but also a business or economic need to remove any undesirable odors from the cabin space of public, used or pre-owned vehicles.

There are other spaces besides automotive cabins where microbial contaminations may linger as well. These include but are not limited to: rooms in a house, hotel rooms (including rentals like Airbnb), hospital rooms, rooms in homes for the aged, intensive care units, surgery rooms, yoga rooms, gyms, restaurants, ships cabins and passenger-use spaces on cruise vessels, trains, buses, aircraft cabins, etc. In general, living spaces and other spaces that humans use regularly and that contain surfaces on which microbes can dwell, are a potential source for spread of infections.

SUMMARY

The following is a summary of some features of the apparatus. Further details may be found in the Detailed Description, here below.

The present technology presents an apparatus that is effective in cleaning the air and surfaces within an enclosed space of a contaminant load, where the load may be viral, or microbial, or malodor (which is often caused by microbial action).

In an exemplary embodiment, there is provided an apparatus for distributing a gaseous agent throughout an enclosed space. The apparatus includes: a container configured to contain a water and a solid or gel pack that releases the gaseous agent upon contact with the water, the container having a base; an aerator in the base of the container; an air distributor in the container configured to distribute air from the aerator into the container; and a lid on the container, the lid having an opening configured to accelerate an air-borne spray of gaseous agent and water therethrough into the space, during use of the apparatus.

In general, the apparatus is placed within an enclosable space where the contaminant is present. The container of the apparatus is charged with a solid of gel pack that releases a gaseous cleaning agent (i.e., an agent capable of treating the contaminant) and water. The space is enclosed, and the apparatus is initiated. The apparatus generates air bubbles using an aerator, and the bubbles agitate the water to cause more rapid release of gaseous cleaning agent from the solid or gel pack. The gaseous cleaning agent (along with fine entrained water droplets) exits from the container via an opening in the lid of the container and spreads throughout the enclosed space. The gaseous cleaning agent fills the air space in the enclosed space, and also deposits, along with water droplets, on surfaces in the space to neutralize malodor producing microbial organisms and destroy viruses on (or in pores, cracks, etc. of) the surfaces.

The apparatus, in various embodiments, may include several features described herein below. For example, the apparatus may be charged with an outside power source or may include a battery to power the apparatus. The battery may be rechargeable.

The air distributor may be configured in various shapes and sizes to facilitate agitation and release of gaseous cleaning agent from the solid or gel pack. Thus, it may be configured in a ring shape and may be located at or near a bottom of the container such that rising bubbles may cause vigorous agitation and accelerated release of gaseous agent.

In another variant, the air distributor may be configured as a spiral and be located vertically within the container, below the water level, when in use, to cause agitation and swirling of the water. To facilitate this, the spiral may have multiple air outlet ports, wherein at least some of the multiple air outlet ports are configured to direct air at a tangent to a spiral outer surface. Because air is very buoyant, and air bubbles will tend to rise almost immediately in water, it may be desirable to provide other material to induce a swirling motion of water in the container. Thus, in another variant, the air distributor has a venturi therein configured to suction water into the (spiral) air distributor. In this case, the air distributor comprises exit ports configured to expel a mixture of air and water.

In another embodiment, the apparatus further includes a digital electronic controller in the base of the apparatus The digital electronic controller includes a communications interface configured to communicate with applications software on a smart device (such as a smart phone or laptop, or the like) preferably having a graphic user interface. Desirably, but not necessarily, the digital electronic controller may be programmable. The digital electronic controller may be configured to receive instructions and input parameters from the smart device and may be configured to transmit information to and receive information from the smart device via any one or more of a wireless, e.g., BLUETOOTH® or WIFI®, or wired connection. The communications interface may be configured to communicate data to and from a server either directly or via the smart device, or both.

Usefully, in another variation, the digital electronic controller may include a timer programmable via applications software of the smart device.

In another exemplary embodiment, there is provided an apparatus for distributing a gaseous agent throughout an enclosed space where this embodiment includes: a container configured to contain a water and a solid or gel pack that releases the gaseous agent upon contact with the water, the container having a base; a lid configured to close an upper opening of the container, the lid having an opening configured to emit gaseous cleaning agent therethrough from the container; an aerator located on an underside of the lid; a power source located on an underside of the lid; a shield, the shield impervious to corrosion by the gaseous cleaning agent by itself or in combination with water, the shield located on the underside of the lid and configured to protect at least the power source while not obstructing the opening in the lid; and an air tube in the container, the air tube configured to supply air from one end connected to the aerator located on the underside of the lid downward to an air bubbler in the container to cause release of gaseous cleaning agent from a solid or gel pack, when the apparatus is in use.

In this instance, any components located on the underside of the lid may be exposed to concentrated and thus potentially corrosive gaseous cleaning agent. Accordingly, this embodiment includes a protective shield. The shield may be of an organic polymeric composition or may be metallic.

This embodiment of the apparatus may also include a digital electronic controller located on an underside of the lid and protected by the shield. The digital electronic controller may include a communications interface configured to communicate with applications software on a smart electronic device having a graphic user interface. Other variants of this exemplary embodiment may include without limitation those discussed here in.

BRIEF DESCRIPTION OF THE DRAWINGS

The foregoing aspects and many of the attendant advantages, of the present technology will become more readily appreciated by reference to the following Detailed Description, when taken in conjunction with the accompanying simplified drawings of exemplary embodiments. The drawings, briefly described here below, are not to scale, are presented for ease of explanation and do not limit the scope of the inventions recited in the accompanying patent claims.

DETAILED DESCRIPTION

Figure 1A:
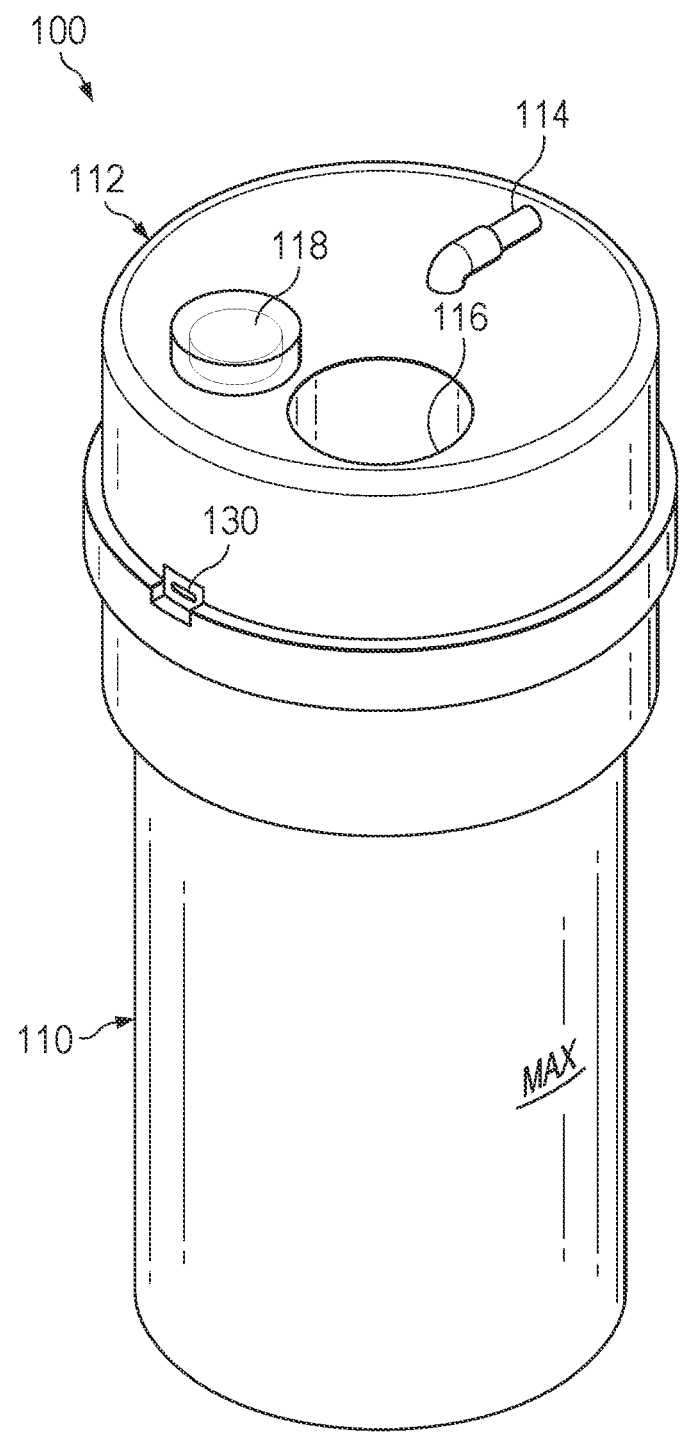
FIG. 1A is a schematic diagram of a prior art apparatus using an aerator to disperse a gaseous cleaning agent, depicting the exterior.

In the following non-limiting detailed descriptions of examples of embodiments of the inventions may refer to appended Figure drawings and are not limited to the drawings, which are merely presented for enhancing explanations of features of the technology. In addition, the detailed descriptions may refer to particular terms of art, some of which are defined herein, as appropriate and necessary for clarity.

The term "cabin" as used in the specification and claims refer to a space containing contaminated surfaces that can readily be enclosed (i.e., it is enclosable), for example by closing doors, windows and an air vent system, if any, of the space such that air inside the space is neither withdrawn nor added to. The air may be allowed to re-circulate in the cabin, however, by activation of an air circulation system, for example, or use of a fan in the cabin. This is useful to also treat ductwork in the air circulation system to remove malodors and to remove or reduce any microbial or viral load.

The terms "enclosable environment," or enclosable space" is meant as synonymous with "cabin," but for the sake of clarity these terms include, but are not limited to, rooms in a house, hotel rooms, hospital rooms, rooms in homes for the aged, intensive care units, surgery rooms, yoga rooms, gyms, restaurants, ships cabins and passenger-use spaces on cruise vessels, trains, buses, aircraft cabins, and the like. So, this should not be read as limited to commonly understood vehicular cabins. In general, the terms encompass living spaces, and other spaces, that humans use regularly, even if intermittently, and that contain surfaces on which microorganisms and viruses can dwell as a potential source for spread of infection, and that may contain factors that give rise to malodor.

The term "cleaning agent" or "a gaseous cleaning agent" refers to a chemical agent such as chlorine dioxide or ozone, and the like, that "cleans" by destroying or reducing a contamination load including microorganisms (including fungi), malodor and viruses. The surfaces that may have a contamination load include, but are not limited to, fine surface textures, surface patterns, and tight interstitial spaces such as found, for example, in stitched seats and dash boards, couches, textiles, tiles, bedding, carpets, tabletops, chairs, floors, wood, interior boundaries (such as walls, ceilings), cabinets, beds, bedding materials, etc.

The terms "contamination" or "contamination load" when used in reference to surfaces within a cabin means microbial, fungal, or viral contamination and also includes contaminants that cause a malodorous scent, for example, of decayed organic matter, fecal matter, and the like.

The term "effective period of time" as it relates to the time that the cleaning agent dwells in a cabin for cleaning of surfaces therein. The effective period may vary from about 3 to about 20 minutes; and in many applications may be from about 3 to about 10 minutes. More or less time may also be effective, depending upon the degree of cleaning (extent of contaminant load reduction) to be achieved, the nature of the chemical cleaning agent used, and the number of repetitions of treatment sequentially, if such repetition is necessary. For example, some enclosed spaces may have surfaces so heavily contaminated as to require a prior washing with a detergent-type cleaner to dislodge surface dirt. Thereafter it may require more than one gaseous cleaning agent treatment or require that the gaseous cleaning agent dwell in the enclosed space for up to 8 hours, or overnight, to achieve a desired level of cleanliness, deodorization, sanitation or disinfection, as applicable.

The term "sealing" in the context of sealing a cabin or an enclosable environment/space means that windows doors and other ingress or exit points are closed. However, if the cabin or the enclosable environment/space has an air duct system that can be set to recirculate air, then setting it to recirculate falls within the meaning of the term "sealing" and it allows potential cleaning of the air duct system.

The term "significant reduction in contamination load" means that the contamination load of a particular contaminating species is reduced by at least 80% after cleaning in exemplary embodiments, or in some exemplary embodiments at least 98% after cleaning.

Several of the following examples discussed in relation to the Figures may relate, for ease of explanation, to vehicles, but it should be understood that the explanations are also applicable to a wide range of different "enclosable/enclosed environments," as defined herein.

Referring to FIGS. 1A and B, there is illustrated a prior art apparatus 100 that includes a container 110 configured to contain water and a solid or gel pack that releases a gaseous cleaning agent. The device is obtainable from Spiffy, Inc. As shown, the container 110 has a lid 112 with an opening 116 in fluid communication with the container interior and configured for gaseous cleaning agent to exit therethrough. An air inlet tube 114 penetrates through the lid to connect to a suction side of an aerator 120 on an underside 113 of lid 112. The lid 112 has a power connection, namely, a USB socket 130 to power the apparatus. Also, on the underside of the lid 112 is mounted a motor (not shown) to drive the aerator 120 and what appears to be a controller (not shown) to stop and start the motor, when stop/start button 118 is depressed.

An air tube 122 extends from a connection at one end to the outlet of the aerator 120 into the container and to an air bubbler 124 at the other end. Thus, in operation, with water and the solid or gel pack 190 that releases gaseous cleaning agent in the closed container, the aerator 120 supplies a flow of air into the closed container 110 via the tube 122 and the bubbler 124. The air causes agitation of the water in the container and exits via opening 116 into the enclosed space being treated carrying gaseous cleaning agent with it.

The lid shows a button 118, used by the user to start the apparatus to initiate a cleaning operation. Thus, lacking remote startup, the operator may be exposed to the gaseous cleaning agent at least at initiation.

Figure 1B:
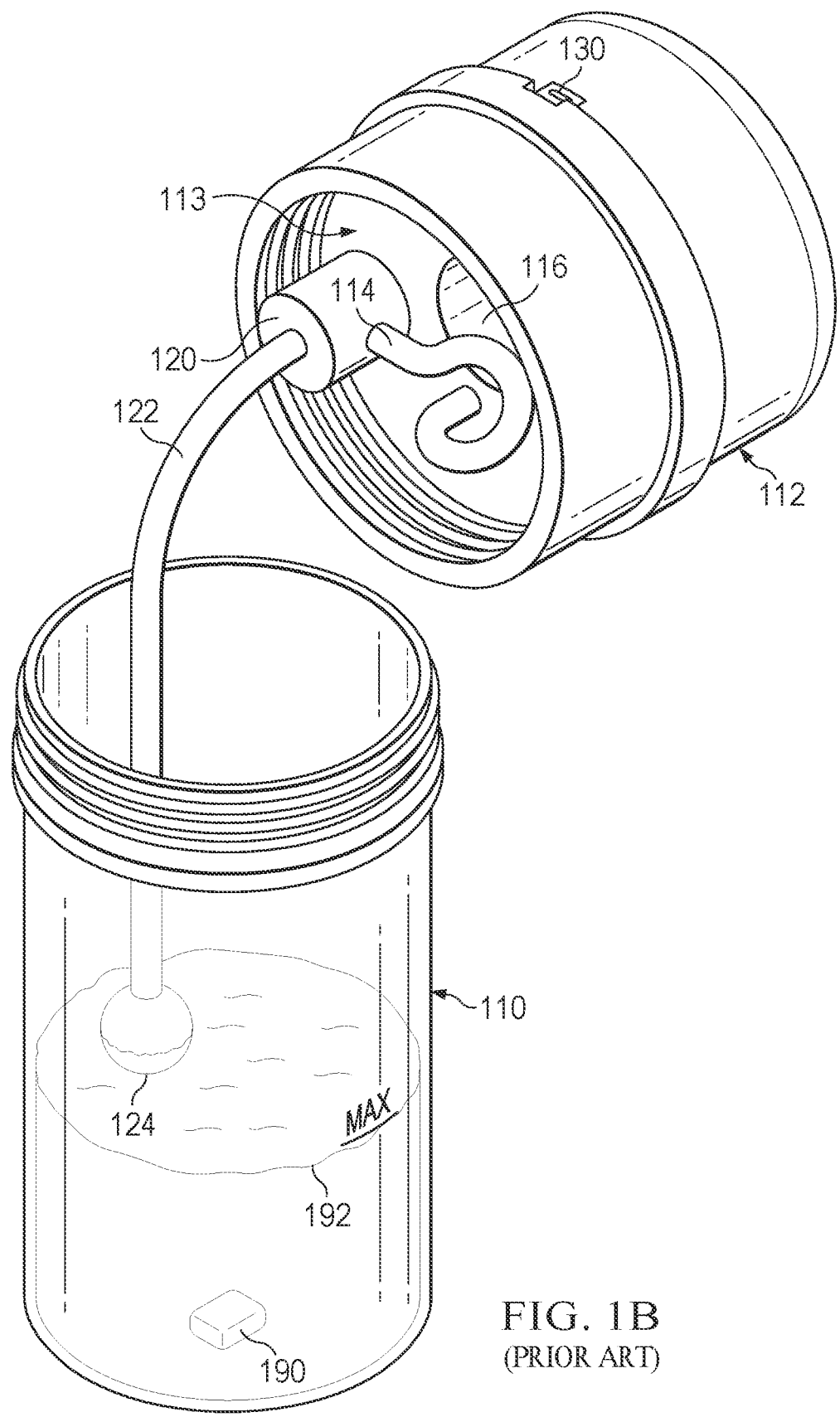
FIG. 1B is a schematic diagram of the prior art apparatus of FIG. 1A depicting internal details with components mounted under the lid.

Upon start up, the closed container 110 has both water, up to a preset level 192 (FIG. 1B) in the container, as well as a solid or gel pack 190 that releases the gaseous cleaning agent, such as chlorine dioxide, upon interaction with the water. The air bubbles from the aerator 120 agitates the water and carries the gaseous agent up the container and out via the opening 116 into the space to be treated.

Figure 2A:
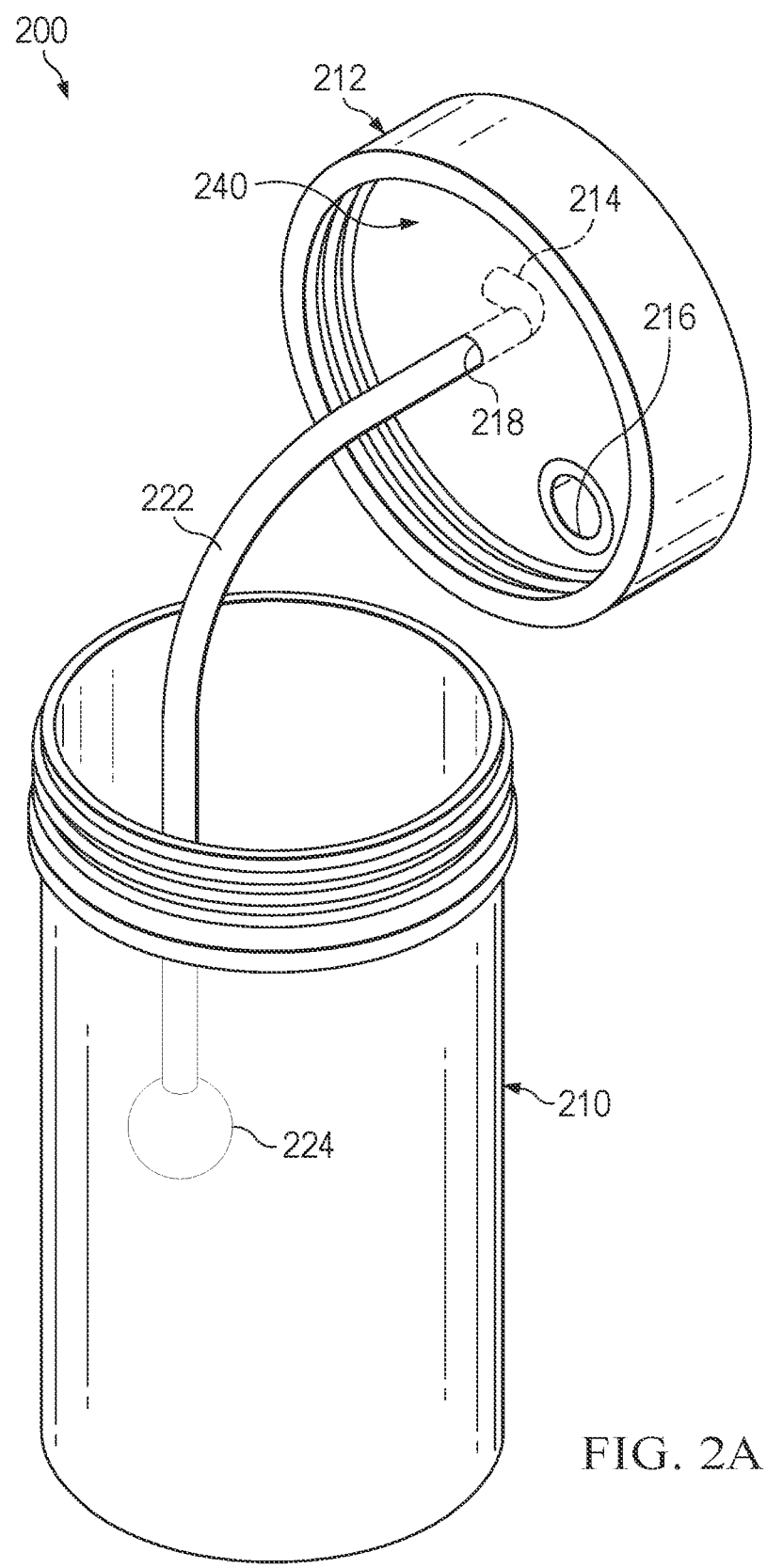
FIG. 2A is an exemplary embodiment of a lid of an apparatus using an aerator to generate a gaseous cleaning agent, including a novel shield for components (not shown) mounted under the lid.
Figure 2B:
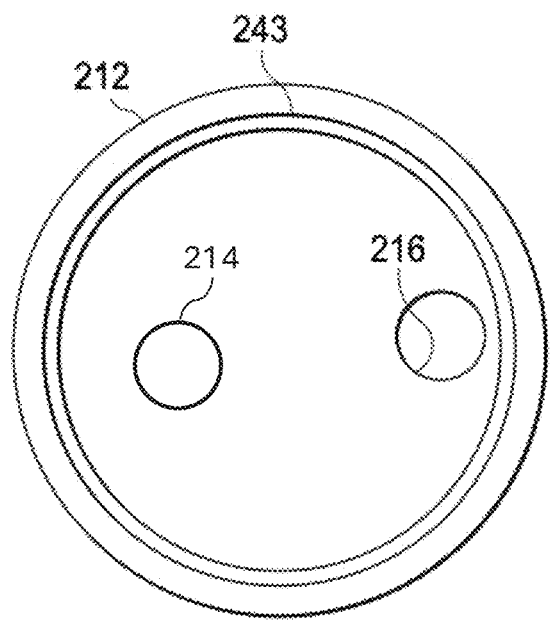
FIG. 2B depicts an alternate view of the lid of the apparatus of FIG. 2A.
Figure 2C:
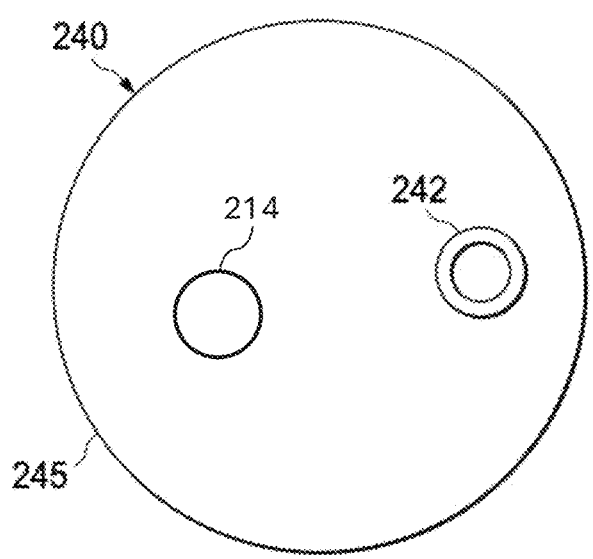
FIG. 2C depicts the shield of that engages the lid of FIG. 2B.

In this prior art device, the components mounted on the underside 113 of lid 112 are exposed to concentrated gaseous cleaning agent and water, and the corrosive effects of the combination during operation. In an embodiment of the present technology, this problem area in the prior art is resolved by use of a corrosion resistant shield, 240 as shown in FIGS. 2A, 2B, and 2C. The illustrated apparatus 200 has a lid 212 with the shield mounted to its underside to cover and seal off vulnerable components (electrical and mechanical) from the corrosive gaseous cleaning agent and water combination. The opening 216 for exit of the gaseous cleaning agent from the apparatus 200 is not obstructed. Thus, the air inlet 214 penetrates both the lid 212 as well as the shield, and the tube is sealed 218 at the point of exit from the shield to prevent flow of corrosive agents into a space behind the shield. As illustrated in FIG. 2B (where the components housed under the lid are not shown for simplicity) the shield 240 is configured with an upwardly extending nozzle 242 that is sized to fit snugly inside the opening 116. In addition, the circumferential periphery 245 of the shield 240 is configured to rest upon a circular ledge 243 inside the lid 212. Thus, as assembled, the shield 240 is tightly adhered to the ledge 243 and seals off the under-lid components. The shield 240 directs the gaseous cleaning agent out through the nozzle 242.

The present shield technology presents a solution to the corrosion of components mounted on a lid underside thereby resulting in longer life and more reliable operation of the components at relatively minimal cost. The shield may be fabricated of organic polymer (or other corrosion resistant material such as stainless steel) and may be adhered (or hot glued or otherwise sealed to the ledge 243 of the lid) to envelope and protect the under-lid mounted components.

The shield 240 does not otherwise interfere with air tube 222 exiting from the aerator or the air bubble 224 that extends into the container 210 when the lid 212 is mounted to the container 210.

Figure 3A:
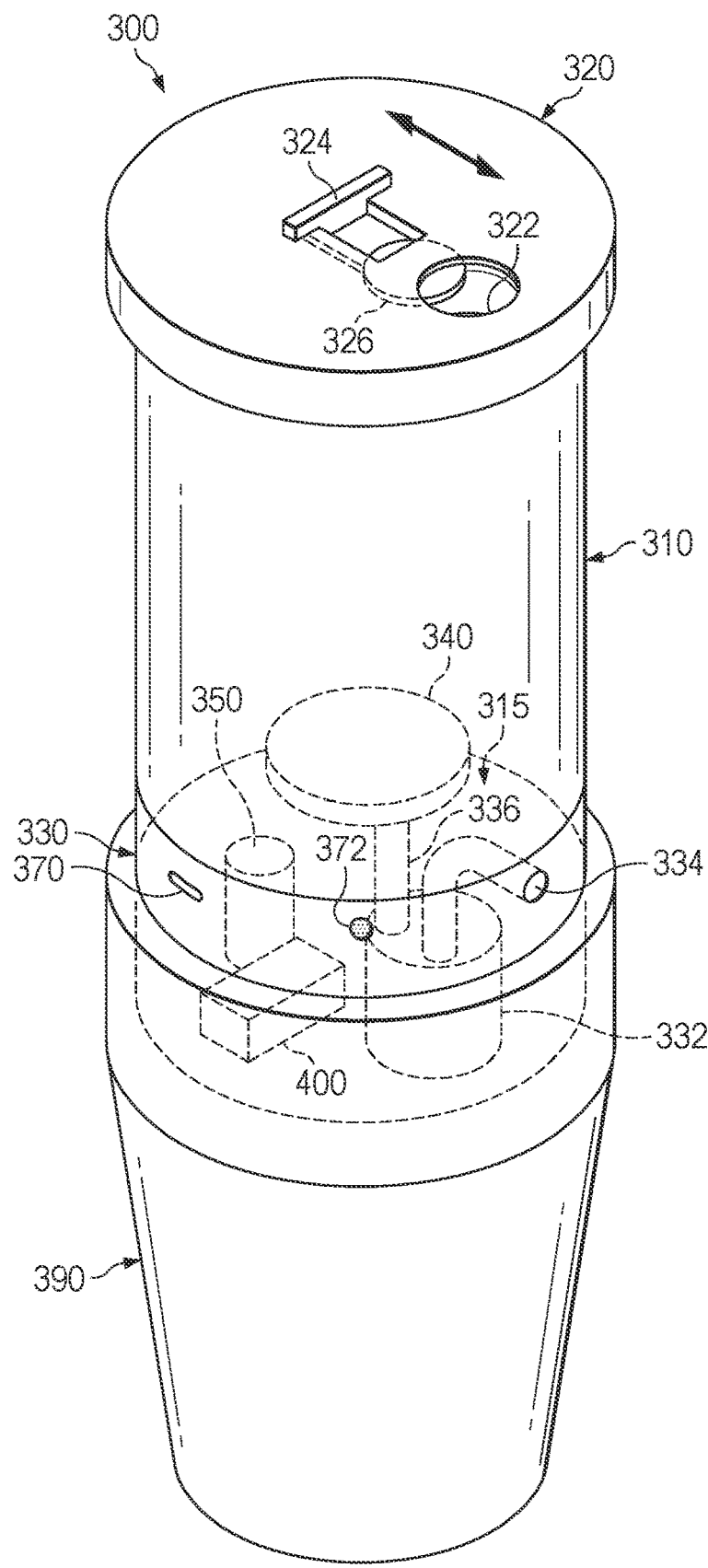
FIGS. 3A and 3B are exemplary illustrations of an apparatus configured to release a gaseous cleaning agent by an aerator-driven air supply from a base of the apparatus into the surrounding environment.
Figure 3B:
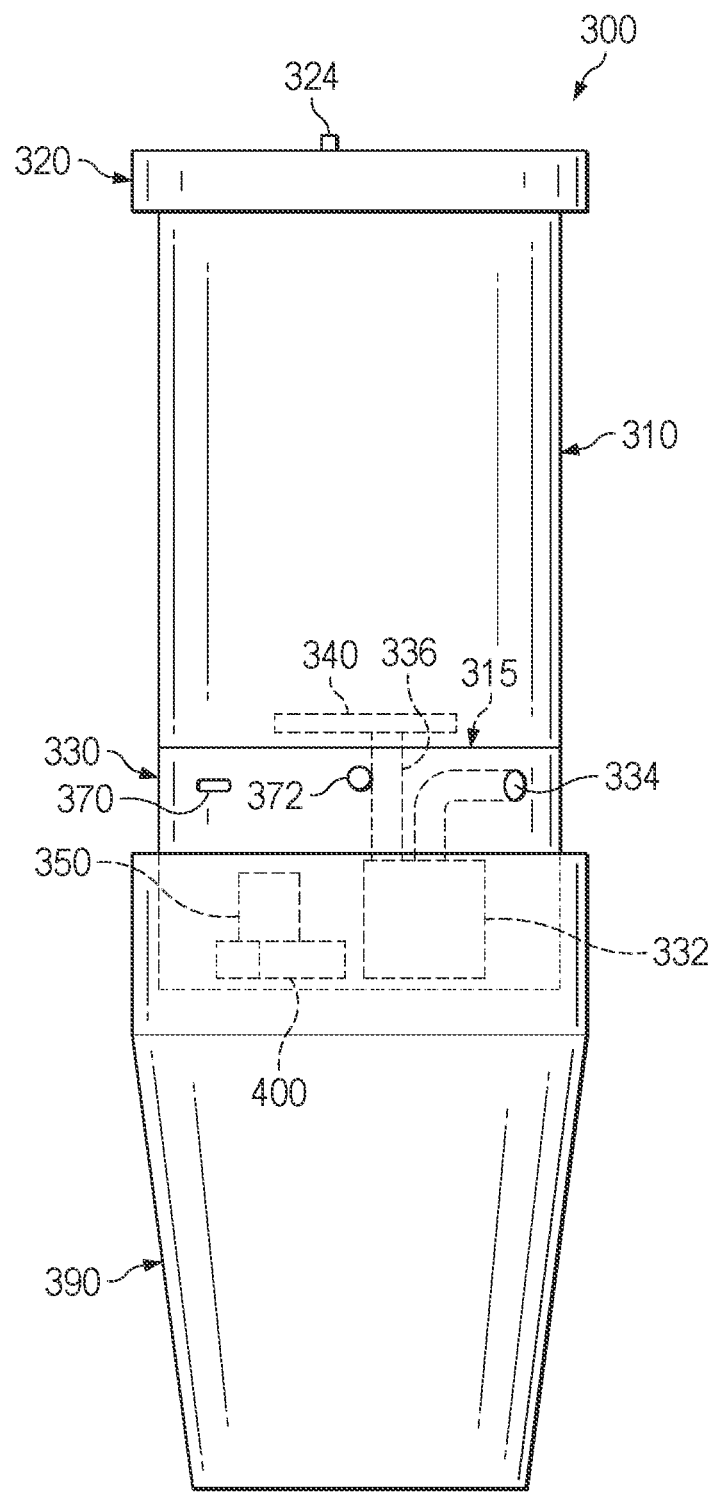

Referring to FIGS. 3A and 3B, there is illustrated an exemplary embodiment of an apparatus 300 that includes a container 310 with a lid 320. The container is divided into two internal spaces by a separator 315 such that the space above the separator 315 contains water and the solid or gel pack during operation, and the space below the separator (base 330) contains the electrical and mechanical components, except that the air distributor 340 extends into the upper space and is supplied with air from the aerator 332 via air tube 336. The lid 320 has an opening 322 that is optionally adjustable with a slide 324 that moves backward or forward to adjust the size of the opening 322 with a sealing plate 326. Although the sealing plate 326 is depicted as generally circular, the sealing plate 326 can have any shape that is dimensioned to be able to at least partially close the opening 322. The container 310 has a base 330 (below the separator 315) that houses components that include: a battery 350, a controller unit 400 and an aerator 332. Air supply to the aerator 332 encased in the base 330 is via an air inlet port 334 in a side of the base. Air from the aerator 332 exits via an air exit tube 336 into an air distributor 340 (shown as a block schematically in FIGS. 3A and 3B). Exemplary non-limiting embodiments of the air distributor are detailed in FIGS. 7 and 8 along with explanatory description.

As illustrated in FIGS. 3A and 3B, the exemplary apparatus 300 includes a battery 350 and a control unit 400, both contained within the base 330.

In the event that it is desired to fit the apparatus into a cup holder, and the base is too bulky, there is also provided a sleeve 390 that slides over the outer surface of the base 330, as illustrated, to provide a smaller sized extended base. The sleeve 390 is configured to avoid covering the air inlet 334 so that air suction into aerator is unimpeded.

In the example shown in FIGS. 3A and 3B, there is a charge port 370 to power the rechargeable battery 350. Of course, if a rechargeable battery is not used, power may be supplied directly via a USB socket or the like, or a non-rechargeable battery may be used. Further, in the example shown, a LED light 372 may indicate that the apparatus is operative and/or that the post treatment time period for safe entry into the treated environment has not yet expired.

Figure 4:
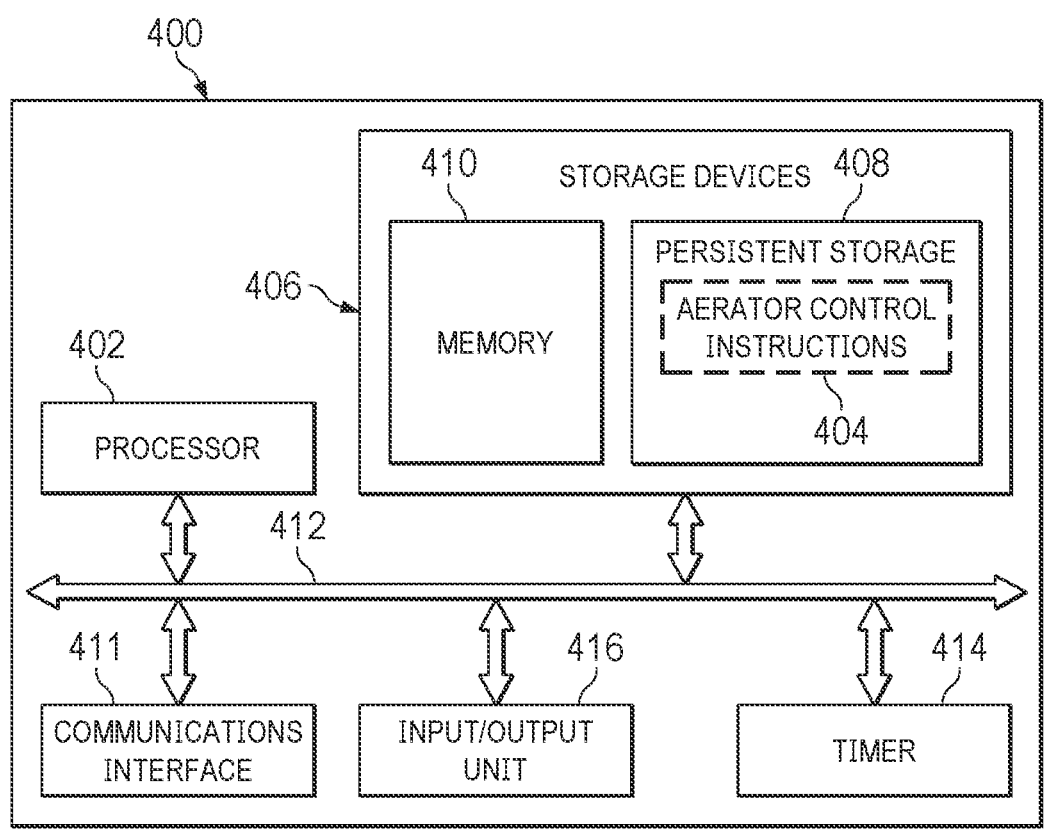
FIG. 4 is a schematic block diagram of a controller for controlling an apparatus for generating a gaseous cleaning agent according to an illustrative embodiment.

As explained with reference to FIGS. 3A and 3B and the block diagram FIG. 4, the apparatus 300 is highly interactive, may be operated remotely, and may be used for data collection. The control unit 400 includes hardware and/or software for controlling the operation of the apparatus 300. For example, the control unit 400 can include a processor 402 executing instructions, e.g., aerator control instructions 404, which can be stored locally in storage devices 406 to control the apparatus 300. The aerator control instructions 404 are depicted as stored in persistent storage 408 but in another embodiment, the aerator control instructions 404 can be stored in memory 410. Additionally, if not originally stored locally to apparatus 300, the aerator control instructions 404 can be transmitted to the apparatus 300 from one or more remote computing devices through a network, such as network 502 shown in FIG. 5. The aerator control instructions 404 can be received by communications interface 411 and sent to storage devices 406 through a communications bus 412. The communications interface 411 could include a network interface card or a wireless transceiver facilitating communications over the network 502. The communications interface 411 may support communications through any suitable physical or wireless communication link(s).

The gaseous cleaning agent is allowed to dwell in the space being cleaned for an effective time period for cleaning, and additional time may be allotted for the atmosphere in the space to clear of the agent before personnel may safely enter the space. The term "effective period of time" as it relates to the time that the cleaning agent dwells in a cabin for cleaning of surfaces therein, the effective period may vary from about 3 to about 20 minutes; and in particular may be from about 3 to about 10 minutes. More or less time may also be effective, depending upon the degree of cleaning (extent of contaminant load reduction) to be achieved, the nature of the chemical cleaning agent used, and the number of repetitions of treatment sequentially, if such repetition is necessary. For example, some cabin spaces may have surfaces so heavily contaminated as to require more than one treatment, or to require that the gaseous cleaning agent dwell on surfaces for up to 8 hours, or overnight, to achieve a desired level of cleanliness, deodorization, sanitization, or disinfection, as applicable.

The effective time of the treatment can be governed by timer 414. For example, a user can set the effective time by interacting with input/output unit 416, which can include a keypad or touchscreen interface presented on the cleaning apparatus 300. Alternatively, the effective time can be provided by a user operating a computing device communicating with the cleaning apparatus 300 over a network. The input/output unit 416 can also include one or more indicators to convey operating information to a user, such as LED 372 or a speaker (not shown) for generating a corresponding sound when the LED 372 is illuminated.

Figure 5:
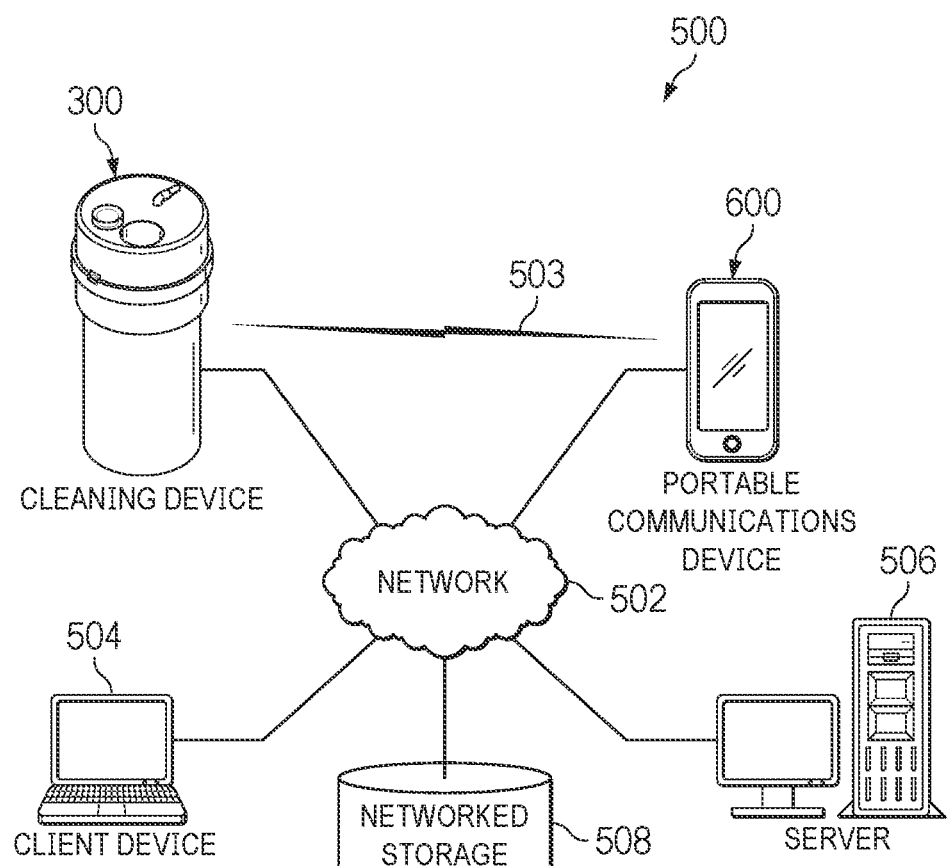
FIG. 5 is a schematic block diagram of a system for controlling an apparatus for generating a gaseous cleaning agent according to an illustrative embodiment.

FIG. 5 is a system 500 for controlling an apparatus for generating a gaseous cleaning agent according to an illustrative embodiment. In some embodiments, the cleaning apparatus 300 can be controlled by one or more electronic devices over network 502. Network 502 can include the internet, the Public Switched Telephone Network (PSTN), cellular networks, and local area networks, among others. Communication over the network 502 can be achieved using various forms of communications equipment and protocols. In some other embodiments, some electronic devices can communicate directly with the cleaning apparatus 300 via a direct communications link 503 while utilizing device-to-device communications protocols.

Electronic devices capable of controlling the cleaning apparatus 300 may be referred to in the alternative as "remote computing devices". Examples of electronic devices that can be used to control cleaning apparatus 300 can include portable communications device 600, described in more detail in FIG. 6 that follows, client device 504 and server 506. These electronic devices can be used to cause the cleaning apparatus 300 to perform actions, including, but not limited to, initiating a cleaning treatment, terminating a cleaning treatment, setting the timer to allow auto-termination upon time elapsed, and the like.

In addition, data (information) may be exchanged between the apparatus 300 and various electronic devices. The data can be stored in local storage, such as storage of client device 504, portable communications device 600, or server 506, or in networked accessed storage 508. This data might include for example, any commercially and technically significant data such as for example, identity of the operator, time treatment was commenced and time it ended, battery charge remaining if the device is battery-powered, and the like operating data. In the case of a rental car being treated, the data might include but is not limited to: renter's identity, the vehicle VIN, make and model, how many treatments the particular device has been used in (to assess its life span), geographic location of vehicle (e.g., depot at which treatment took place), etc. Likewise for a hotel or Airbnb® data might include information relative to the client, and commercially useful information such as the time of treatment, the nature of the contaminant (e.g., tobacco or another malodor) etc. as needed under the circumstances.

Figure 6:
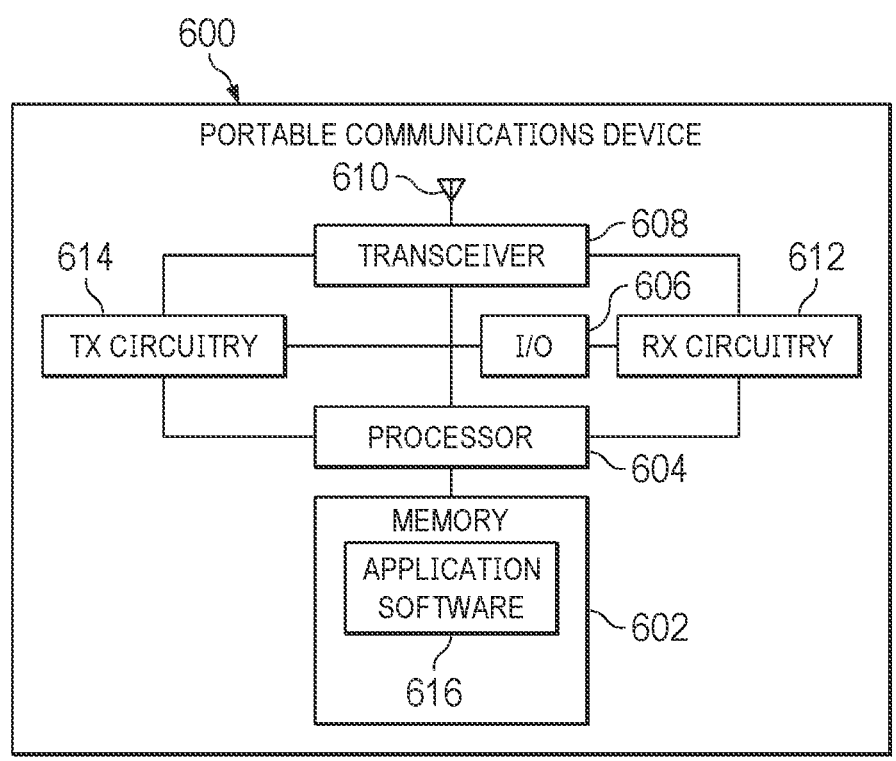
FIG. 6 is a schematic block diagram of a portable computing device for controlling an apparatus for generating a gaseous cleaning agent according to an illustrative embodiment.

FIG. 6 is a schematic block diagram of a client device for controlling an apparatus for generating a gaseous cleaning agent according to an illustrative embodiment. The portable communications device 600 is provided for illustration only.

Portable communications device 600 includes memory 602 storing instructions that can be executed by processor 604 for controlling the operation of the portable communications device 600. For example, the memory can store an operating system and one or more applications that can be executed by the processor 604. The memory 602 can include random access memory (RAM), Flash memory, and/or read-only memory (ROM).

I/O 606 is one or more input/output (I/O) devices of the portable communications device 600. Examples of I/O devices include, but are not limited to, a microphone, a speaker, a camera, a touch screen, a keypad. I/O 606 enables a user to interact with the portable communications device 600 to communicate with a client, i.e., via a phone call, text message, email, or videoconference. In some embodiments, I/O 606 also includes I/O interfaces that provide the portable communications device 600 with communications paths with other devices, such as other client devices and peripherals.

The transceiver 608 provides a wireless communications capability with a network, such as network 502 in FIG. 5. Incoming signals are received by the transceiver 608 from the antenna 610 and processed by the receive (RX) circuitry 612, which processes the signal and transmits the processed signal to an I/O device, such as a speaker, if the processed signal is for voice data. The processed signal can also be transmitted to the processor 604 for further processing before presentation to a user on another I/O device, such as a screen, if the processed signal is for other forms of data, such as web browsing data. Outgoing signals transmitted by the transceiver 608 from the antenna 610 are received from transmit (TX) circuitry 614. The TX circuitry 614 can receive voice data from a microphone, or other forms of outgoing data, such as web data, e-mail, or application data, from the processor 604.

The portable communications device 600 in FIG. 6 is depicted as a mobile phone, the portable communications device 600 can be any other conventional client computing devices such as tablets, laptop computers, and desktop computers. For example, the transceiver depicted in the portable communications device 600 can be replaced by a network communications interface that can support wired or wireless communication over a user's home network.

In an illustrative embodiment, a user operating the portable communications device 600 can run application software 616 stored in memory 602 to control operation of an apparatus 300. When executed on the portable communications device 600, the application software 600 can provide a user interface allowing a user to provide operating parameters that can be transmitted to the apparatus 300 through a network, such as network 502 in FIG. 5.

Figure 7A:
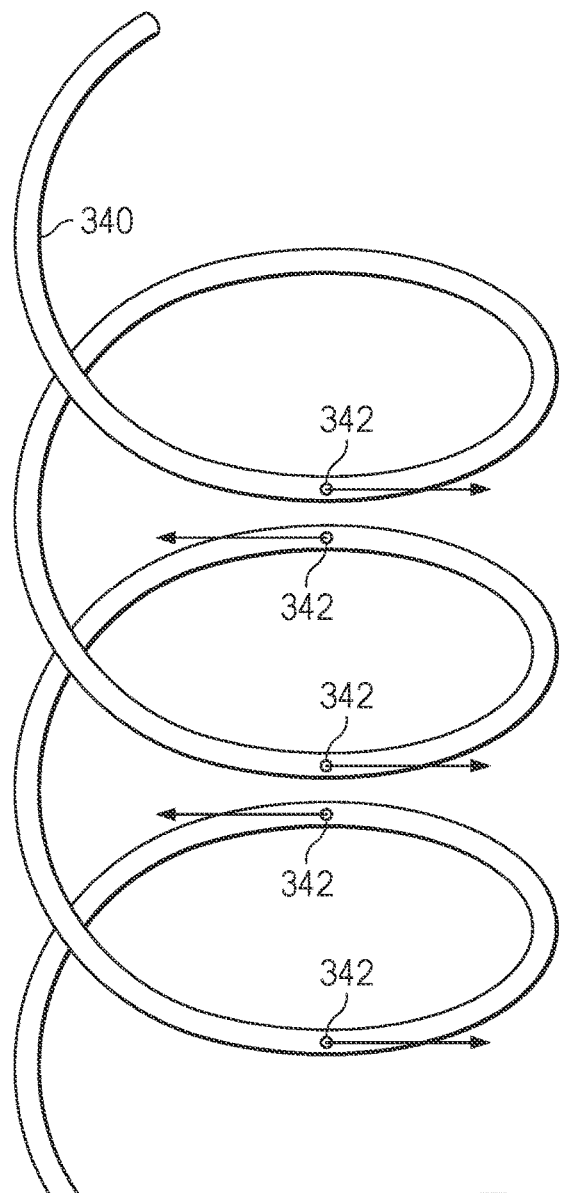
FIG. 7A is a schematic diagram showing an exemplary spiral-shaped air distributor for use in the apparatus of FIG. 3.
Figure 7A:
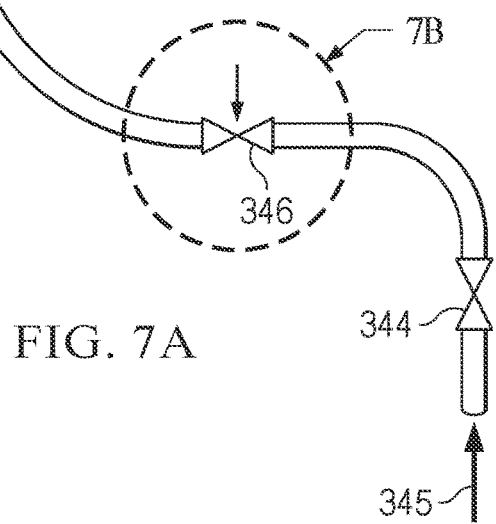
Figure 7B:
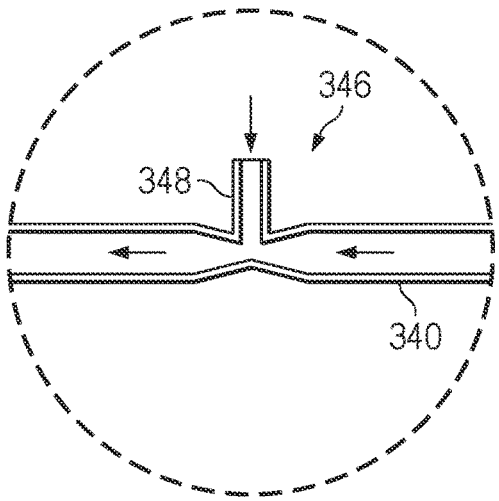
FIG. 7B is more detailed view of a portion of the spiral-shaped air distributor shown in FIG. 7A.
Figure 8:
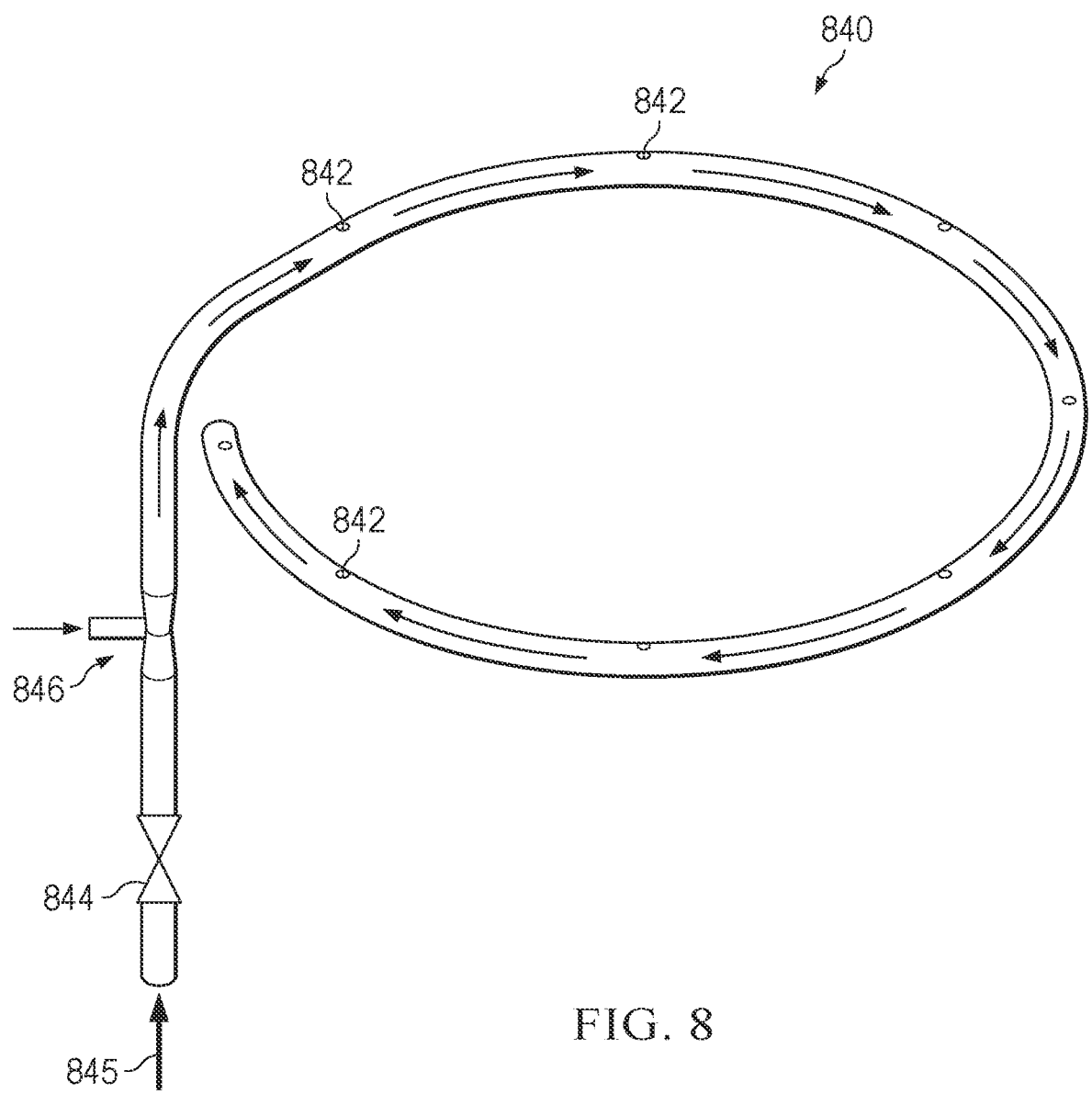
FIG. 8 is a schematic diagram showing an exemplary circular-shaped air distributor for use in the apparatus of FIG. 3.

FIGS. 7 and 8 depict exemplary embodiments of air distributors that may be used in conjunction with the apparatus 300 of FIG. 3. Of course, other air distributors of various configurations may also be used. In FIG. 7A distributor 340 is an air tube in the shape of a coil spring, or spiral shaped. It is preferably configured to fit within the container and to be below the water line. Air is very buoyant in water and would immediately rise upward. To improve agitation, this embodiment is configured to cause the water to swirl in the container. Inlet air, shown as arrow 345, is supplied by an air generator, such as an aerator (not shown). Thus, air exiting from outlet ports 342 (shown by arrows) are at a tangent to the spiral tube surface. In some embodiments, the outlet ports 342 include channels formed through the sidewalls of the air distributor 340 at an angle relative to the sidewall so that fluid exiting the outlet ports 342 has a directional component that is tangential to circular shape formed by the air distributor 340. To improve the swirling motion, the distributor 340 may be supplied with a venturi tube 346, shown in more detail in FIG. 7B, which will suction in water from venturi tube inlet 348 that will gain momentum in the coil before being expelled with air from outlet ports 342. The water expelled has a tangential velocity component that may induce swirling and improved agitation. To prevent backflow of water (potentially corrosive) into the aerator, the air distributor 340 can include a non-return valve 344 blocking water flow to the aerator. While the outlet ports 342 are depicted as apertures in the sidewall of the air distributor 340, in other embodiments, the outlet ports 342 can be in the form of nozzles or projections extending from the sidewall of the air distributor 340, which can redirect the outflow of fluid from the air distributor 340 to cause swirling fluid flow in the container of the apparatus 300. This swirling may produce a vortex in the container volume and may cause the release of an air borne spray of water droplets and gaseous cleaning agent from the air outlet of the container and into the enclosed space being treated. Such swirling is advantageous and may enhance not only cleaning due to the air borne spray generated but may also reduce the effective time needed for cleaning.

FIG. 8 illustrates a circular air distributor 840. The air distributor 840 may have a non-return valve 844 and may include a venturi tube 846 (see, FIG. 7B for an example) in the flow path, as shown. Air from the aerator, represented by arrow 845, flows through the air distributor 840 and exits from multiple ports 842 to cause bubbling and agitation of the water in the container. As with the coil of FIG. 7, the venturi tube 846 may enhance the agitation effects.

While examples of embodiments of the technology have been presented and described in text and some examples also by way of illustration, it will be appreciated that various changes and modifications may be made in the described technology without departing from the scope of the inventions, which are set forth in and only limited by the scope of the appended patent claims, as properly interpreted and construed.

The invention claimed is:

1. An apparatus for distributing a gaseous agent throughout a space, the apparatus comprising:
   a container configured to contain a water and a solid or gel pack that releases the gaseous agent upon contact with the water, the container having a base;
   an aerator in the base of the container;
   an air distributor in the container configured to distribute air from the aerator into the container; and a lid on the container, the lid having an opening configured to accelerate an air-borne spray of gaseous agent and water therethrough into the space, during use of the apparatus.

2. The apparatus of claim 1, further comprising a battery to power the apparatus.

3. The apparatus of claim 2, wherein the battery is rechargeable.

4. The apparatus of claim 1, wherein the apparatus is powered by an external power source.

5. The apparatus of claim 1, wherein the air distributor is configured in a ring shape and is located at or near a bottom of the container.

6. The apparatus of claim 1 wherein the air distributor is configured as a spiral and is located in the container.

7. The apparatus of claim 6, wherein the spiral has multiple air outlet ports, at least some of the multiple air outlet ports angled to eject air at a tangent to a spiral outer surface where the air outlet port is located.

8. The apparatus of claim 1, wherein the air distributor further comprises a venturi tube configured to suction water into the air distributor and the air distributor comprises outlet ports configured to expel a mixture of air and water.

9. The apparatus of claim 7, wherein the air distributor further comprises a venturi tube configured to suction water into the air distributor and at least some of the multiple air outlet ports of the distributor are configured to expel air and water at a tangent to a spiral outer surface where the at least some air outlet ports are located.

10. The apparatus of claim 1, further comprising a digital electronic controller in the base of the apparatus, the digital electronic controller comprising a communications interface configured to communicate with applications software on a remote computing device having a graphic user interface.

11. The apparatus of claim 10, wherein the digital electronic controller is programmable.

12. The apparatus of claim 10, wherein the digital electronic controller is configured to receive instructions and input parameters from the remote computing device.

13. The apparatus of claim 10, wherein the digital electronic controller is configured to transmit information to and receive information from the smart device via any one or more of wireless or wired connection.

14. The apparatus of claim 11, wherein the digital electronic controller includes a timer, the timer programmable via applications software of the remote computing device.

15. The apparatus of claim 5, wherein the air distributor has air outlets configured to provide a swirling motion to liquid in the container, when the apparatus is in use.

16. The apparatus of claim 10, wherein the communications interface is configured to communicate data to and from a server either directly or via the remote computing device, or both.

17. The apparatus of claim 10, wherein the communications interface is configured to communicate data to and from a server, either directly or via the remote computing device, or both.

18. An apparatus for distributing a gaseous agent throughout a space, the apparatus comprising:
a container configured to contain a water and a solid or gel pack that releases the gaseous agent upon contact with the water;
a lid configured to close an upper opening of the container, the lid having an opening configured to emit the gaseous agent therethrough from the container;
an aerator located on an underside of the lid;
a power source located on an underside of the lid;
a shield located on the underside of the lid and preventing the power source and the aerator from being exposed to the gaseous agent; and
an air tube in the container, the air tube configured to supply air from the aerator located on the underside of the lid downward through an aperture in the shield to an air bubbler in the container to cause release of gaseous agent from a solid or gel pack, when the apparatus is in use.

19. The apparatus of claim 18, wherein the shield comprises an organic polymeric composition.

20. The apparatus of claim 18, further comprising a digital electronic controller, the digital electronic controller located on an underside of the lid and protected by the shield, the digital electronic controller comprising a communications interface configured to communicate with applications software on a remote computing device having a graphic user interface.

21. The apparatus of claim 20, wherein the digital electronic controller is programmable.

22. The apparatus of claim 20, wherein the digital electronic controller is configured to receive instructions and input parameters from the remote computing device.

23. The apparatus of claim 20, wherein the digital electronic controller is configured to transmit information to and receive information from the remote computing device via any one or more of a wireless or wired connection.

24. The apparatus of claim 20, wherein the controller includes a timer, the timer programmable via applications software of the remote computing device.

25. The apparatus of claim 18, wherein the air bubbler has air outlets configured to provide a swirling motion to liquid in the container, when the apparatus is in use.

26. The apparatus of claim 18, wherein:
the shield comprises a second aperture; and
when the apparatus is in use, gaseous agent exits the apparatus through the second aperture without contacting the power source or the aerator.

* * * * *